United States Patent [19]
Fletcher

[11] Patent Number: 5,882,514
[45] Date of Patent: Mar. 16, 1999

[54] APPARATUS FOR MAGNETICALLY TREATING FLUIDS

[76] Inventor: Charles J. Fletcher, 7 Valley Rd., Sparta, N.J. 07871

[21] Appl. No.: 897,698

[22] Filed: Jul. 21, 1997

Related U.S. Application Data

[60] Provisional application No. 60/024,295 Aug. 22, 1996 and provisional application No. 60/037,831 Feb. 6, 1997.

[51] Int. Cl.$^6$ .................................................. F02M 33/00
[52] U.S. Cl. .................... 210/223; 123/528; 422/186.01; 210/222
[58] Field of Search ..................................... 210/222, 223, 210/695, 360.1, 446; 123/536, 538; 422/186.01

[56] References Cited

U.S. PATENT DOCUMENTS

| | | | |
|---|---|---|---|
| 4,226,720 | 10/1980 | Brigante | 210/222 |
| 4,414,951 | 11/1983 | Saneto | 210/538 |
| 4,568,901 | 2/1986 | Adam | 335/305 |
| 4,659,479 | 4/1987 | Stickler et al. | 210/695 |
| 4,772,387 | 9/1988 | Simoni | 210/132 |
| 4,933,151 | 6/1990 | Song | 210/222 |
| 5,126,046 | 6/1992 | Gomez | 210/446 |
| 5,161,512 | 11/1992 | Adam et al. | 123/538 |
| 5,249,552 | 10/1993 | Brooks . | |

*Primary Examiner*—David A. Reifsnyder
*Attorney, Agent, or Firm*—Law Offices Pollock, Vande Sande & Amernick

[57] ABSTRACT

An apparatus for magnetically treating a fluid comprising a magnetic cartridge arranged within a shell to define a fluid passage between the inlet and the outlet of the shell and having components for subjecting fluid in the passage to both turbulence and magnetic forces. The magnetic cartridge comprises magnetic discs and may define either or both a central passage and an annular passage through the shell. The annular passage may be further defined by a spiral coil for accelerating the fluid, and the coil and the surface of the cartridge may be made of catalytic metals for enhancing the fuel treatment.

21 Claims, 4 Drawing Sheets

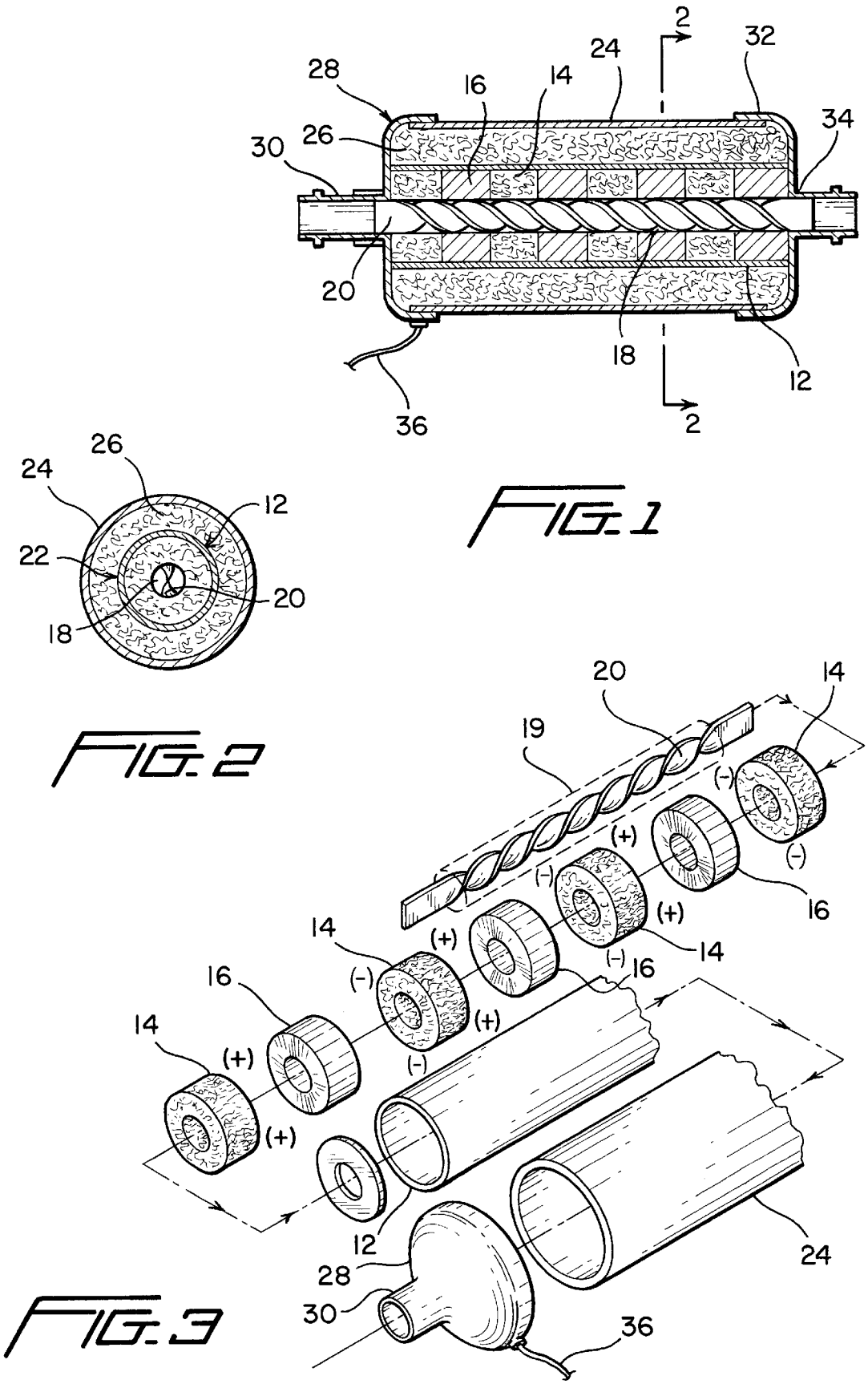

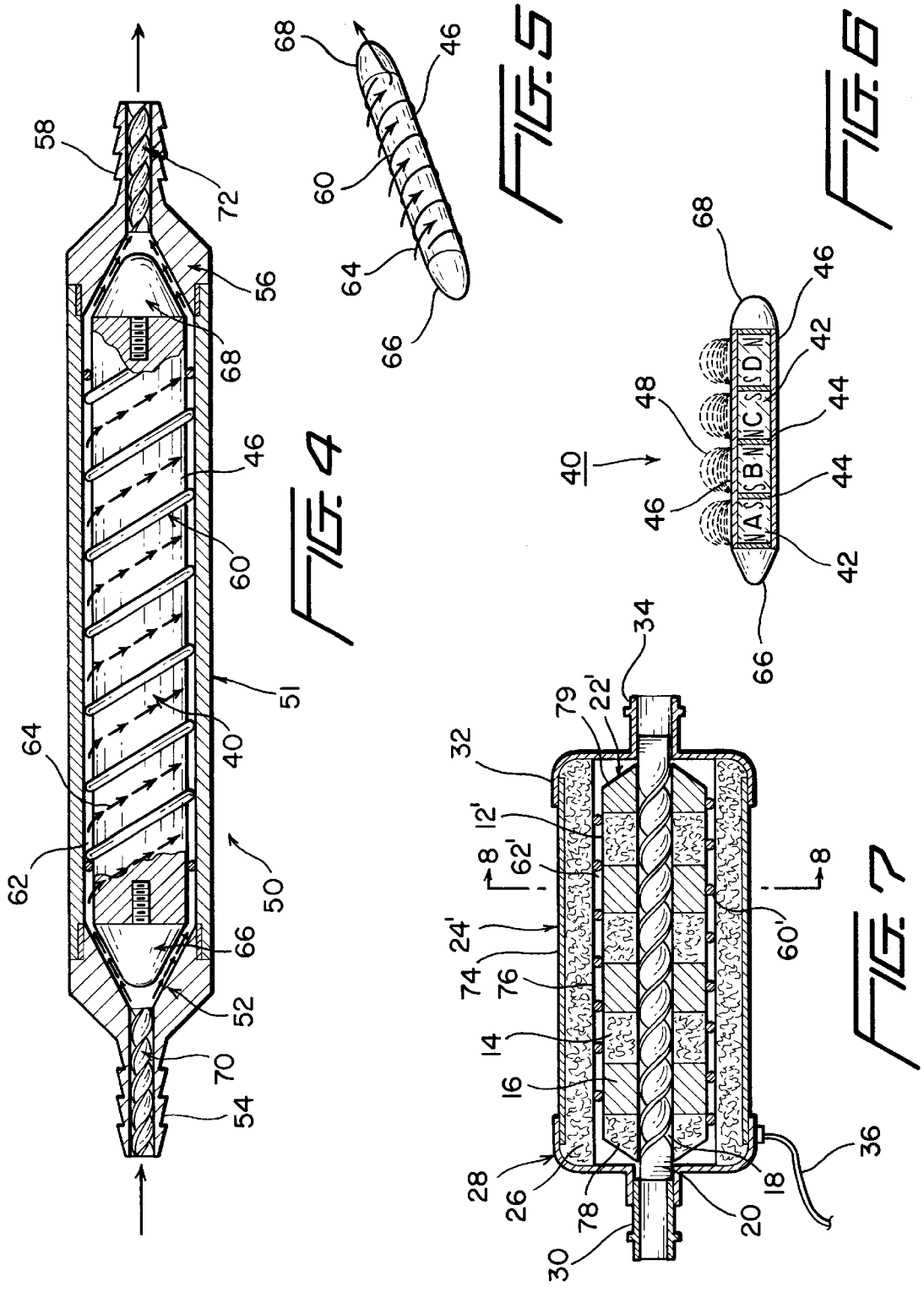

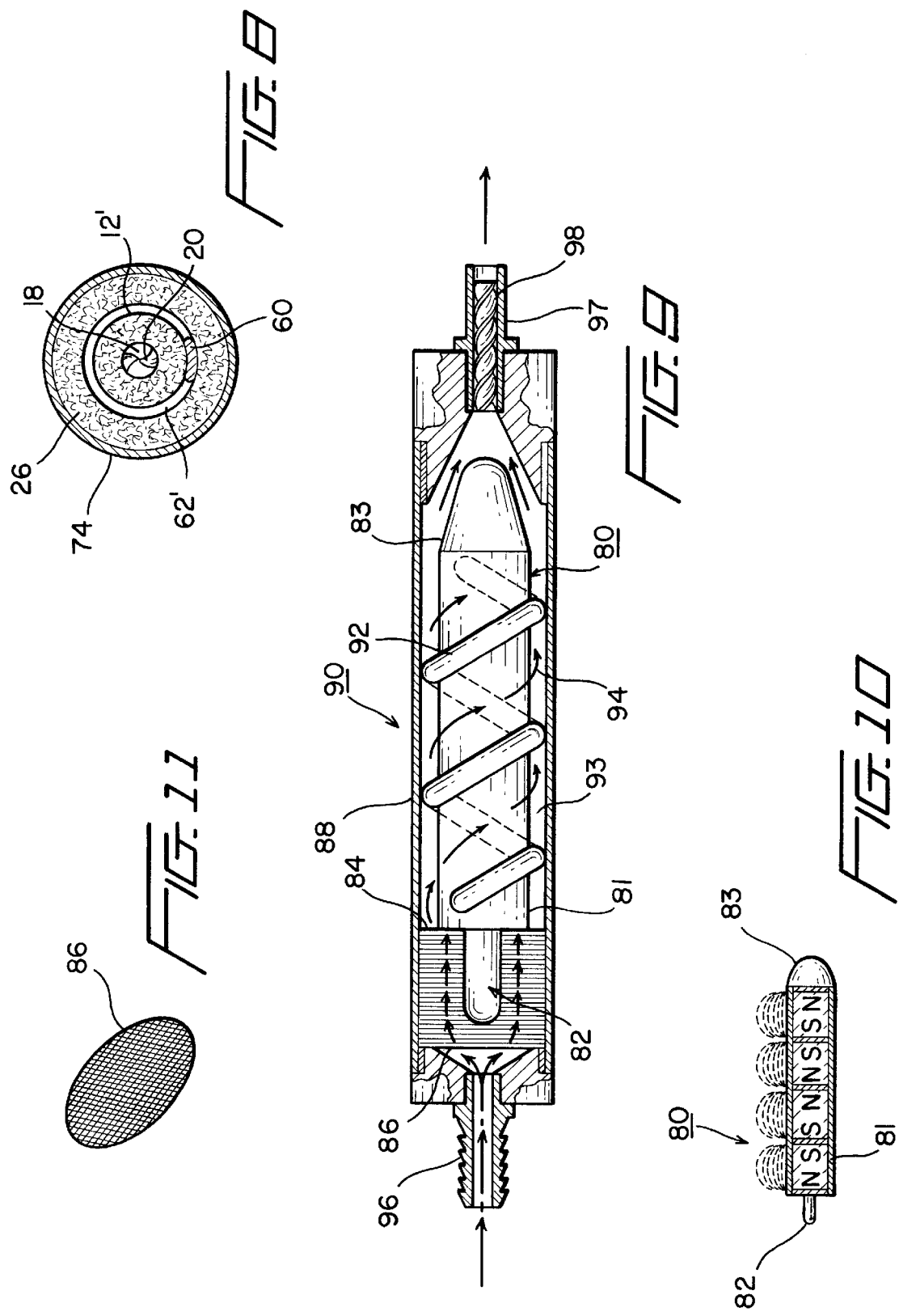

APPARATUS FOR MAGNETICALLY TREATING FLUIDS

RELATED APPLICATIONS

This application claims the benefit of U.S. Provisional Application No. 60/024,295, filed Aug. 22, 1996, and U.S. Provisional Application No. 60/037,831, filed Feb. 6, 1997, both entitled "FUEL EFFICIENCY APPARATUS". The entire contents of these provisional applications are incorporated herein by reference.

TECHNICAL FIELD

The present invention relates to a method and apparatus for magnetically treating fluids, more particularly to treating hydrocarbon fuels to enhance the combustion efficiency thereof and to treating other fluids such as water to remove contaminants therein.

BACKGROUND OF THE INVENTION

Although the exact chemical and nuclear mechanisms through which magnetic treatments produce changes in fluids are not completely understood, the changes effected by known magnetic conditioning devices for treating fluids are measurable and reproducible. There is also some theoretical basis for the effectiveness of magnetic devices in ionizing fluids, such as the electron theory propounded by J. D. van der Waals. According to this theory, the interlocking forces between electrons and the nuclei of compounds containing hydrogen may be influenced by magnetic fields.

Fluid conditioning devices have been suggested in the past for providing an increase in fuel economy through the use of magnets or catalysts, and some of these appear to have shown modest improvements in the performance of fossil fuel combustion devices. However, these devices involve numerous parts, are bulky in size and high in cost, and have seldom shown marked improvements in the economic performance of combustion devices. Consequently, there is a dire need for a simple, no moving parts fuel economizer capable of dramatically improving the burning efficiency of fossil fuels and significantly reducing the pollution emissions from such combustion, while doing so with reliability and low cost over the life of the combustion device.

SUMMARY OF THE INVENTION

It is believed that the present invention provides a unique arrangement of magnets and conduits for carrying both gaseous and liquid fluids across the magnetic field lines generated by the magnets. The invention thereby exposes the fluids to magnetic fields in a manner that may create molecular dipoles in the fluids, and that also may induce electrostatic fields in the fluids.

In the case of hydrocarbon fuels, the invention further provides for contacting the fuel with unique catalytic alloys to improve the combustion characteristics of the fuel. These new alloys are relatively inexpensive, as compared to prior art alloys used for this purpose, because they comprise copper, zinc, nickel, magnesium and aluminum, which are relatively inexpensive metals.

Therefore, a principal object of the invention is the treatment of fossil fuels to provide more complete burning thereof, and thereby affect an increase of power, freedom from carbon deposits, removal of existing carbon deposits, and cleaner plugs for generating an ignition spark, all coupled with increased economy and a reduction in the fuel volume required to travel a given distance.

Other objects of the invention include providing an apparatus that increases the volatility of fossil fuels, substantially increases the performance of combustion devices using such fuels, has no moving parts, minimizes polluting emissions (particularly from automotive vehicles) to protect the environment, is extremely compact, and is sufficiently durable to have a useful life beyond that of the combustion device using the treated fuel.

To accomplish these objects in accordance with the present invention, there is provided an apparatus for causing a fossil fuel to disassociate during its transition through the apparatus so that it might be more completely burned in a combustion engine. The apparatus is preferably mounted just upstream of the location where the fuel is injected into the combustion chamber. One embodiment of the apparatus comprises a shell, preferably cylindrical in shape, for housing the other components of the invention. These components may include an innermost tube having substantially the same cross-sectional area as a fuel inlet line into the shell. This inner steel tube may have a twisted strip or ribbon mounted internally throughout its length. This twisted strip is sometimes referred to herein as a "static accelerator" because of its ability to accelerate the fuel by directing it along a spiral path as it passes through the inner steel tube.

Surrounding the inner steel tube within the shell are a series of powerful annular magnetic discs which are strung over the tube containing the accelerator strip. The magnetic discs are separated from each other by annular spacer discs so that the spacing between the magnetic discs is optimized for creating magnetic disturbances for breaking up or ionizing the molecules of the fuel. The spiral motion of the fuel and the magnetic lines of force generated by the spaced magnetic discs are preferably chosen so as to maximize the magnetic force lines traversed by the fuel flow. The spacer discs separating the magnetic discs are preferably made of a non-magnetic plastic, such as teflon. Thus, a plurality of annular magnetic and spacer discs are positioned end to end in a column and alternated so that adjacent annular magnets are separated by an annular spacer disc of a non-magnetic material. The magnets in the column are preferably arranged such that opposite poles of adjacent magnets face each other.

It is believed that the magnetic disturbance in combination with the turbulent condition of the fuel caused by its spiral motion maximizes the degree of molecular breakdown or ionization just prior to the fuel being injected into the combustion chamber of a typical combustion engine. The maximized molecular dissociation in turn insures optimum combustion of the fuel for drastically reducing, if not eliminating, the pollutants which are known to be emitted in the exhaust of combustion engines.

In a second embodiment of the invention, the inner most steel tube is eliminated by permitting the fuel to flow directly through the apertures of the annular magnetic discs and the annular plastic spacers. In this instance, the fuel passage is formed by the central apertures of the discs, which are positioned end to end in a column with the magnetic discs alternated with the spacer discs. The column of discs is then tightly housed in a stainless steel casing. Located around this steel casing is the shell, which may cooperate with the casing to form a chamber for holding an insulating material. The shell may also serve as a safety container, should a possible fuel leak occur from the casing filled with the cylindrical column of discs. In addition, the spiral twisted steel strip previously described may also be placed in the fuel passage formed by the continuity of the central apertures of the column of discs.

In a third embodiment of the invention, solid magnetic discs in the form of short cylinders are alternated with solid, relatively thin, spacer discs to form a column, and this column is tightly fitted in a casing, preferably of stainless steel. The spacer discs are preferably made of a magnetizable material so as to form pole pieces, which are energized by the magnets and direct concentrated magnetic lines of force radially through the casing. The alternating polarity of the magnetic discs along the column length create magnetic circuits having curving lines of flux between adjacent pole pieces. Between the disc casing and an outer cylindrical shell, there is provided a round or rectangular rod that is wound in a spiral to form a coil similar to a spring. This coil forms a spiral passage for the fluid to flow around the casing containing the magnetic and spacer discs. At each end of the casing there is preferably a cone shaped nose piece for directing the flowing fluid into and out of the spiral passage. This cone-shaped nose piece provides for a smooth transition of the fluid, especially a liquid fluid, into the spiral passage formed by the spiral coil between the magnet casing and the outer housing or shell.

A fourth embodiment of the invention combines certain features of the second and third embodiments to provide a fluid treating apparatus wherein separate fluid passageways are provided internally and externally to a column of annular magnetic discs alternated with annular spacer discs. In this embodiment, the central apertures of the discs provide a central passageway for the fluid through the magnetic casing and a spiral coil provides a spiral passageway around the exterior of the magnetic casing. The central passageway may contain a twisted metal strip as a static fluid accelerator of the type previously described. The outer coil serves as a second static accelerator to similarly accelerate to the fluid in the outer passageway. The turbulence caused by such accelerations of the fluid is believed to generate electrostatic forces that, along with the magnetic forces, tend to break up or ionize the molecules of the fluid.

A fifth embodiment of the invention comprises a modification of the third or fourth embodiment wherein the spiral coil comprises a plurality of catalytic metals, such as copper, zinc, nickel, magnesium, tin and aluminum each in substantial amounts. These metals may be present by weight about 25–55% copper, about 15–35% zinc, about 5–25% nickel, about 5–25% magnesium, about 1–10% tin and about 1–10% aluminum; and are preferably present in the weight percentage ranges of about 30–50% copper, about 15–35% zinc, about 10–20% nickel, about 10–20% magnesium, about 1–5% tin, and about 1–5% aluminum; more preferably about 35–45% copper, about 20–30% zinc, about 12–18% nickel, about 12–18% magnesium, about 2–3% tin, and about 2–3% aluminum; and most preferably about 40% copper, about 25% zinc, about 15% nickel, about 15% magnesium, about 2.5% tin, and about 2.5% aluminum.

As an alternative to the coil composition described in the preceding paragraph, this spiral baffle may be made of one or more of the metals mentioned, and the remainder of the metals mentioned may be incorporated in a coating composition coated on the surface of the casing containing the magnetic and spaces discs. For example, the baffle may be made of at least about 50% copper and the casing coated with a composition comprising by weight about 15–45% zinc, about 2–20% nickel, about 5–25% magnesium, about 1–10% tin, and about 1–10% aluminum.

In a sixth embodiment, the magnetic cartridge of the fifth embodiment is preceded by a plurality of screens in the shape of discs, some of which are annular so as to be fitted on a nose plug extending upstream of the magnetic cartridge. Screens made of silver are preferably alternated with screens made of stainless steel and the size of the screen holes is preferably about 18 mesh.

Because of its relatively simple construction, the apparatus of the invention will be substantially maintenance free. The apparatus may be used to treat a variety of fluids, including water and various types of fossil fuel, such as gasoline, diesel fuel, kerosene, fuel oil, natural gas and propane. With respect to fuels, the degree to which combustion economy will be improved depends on the degree to which the turbulence and the magnetic forces break down or ionize the molecules of the specific fuel being treated. In other words, the better the dissociation of the molecules of a specific type of fuel prior to its reaching the combustion chamber, the more efficient will be the conversion of each molecule of the fuel to energy so as to leave little or no hydrocarbon emissions. It is believed that, in general terms, the improved performance provided by using the invention with current combustion systems will result in major environmental improvements by significantly reducing pollutants in combustion exhaust. By reason of the reduction achieved, it may be possible to completely eliminate conventional catalytic converters from future motor vehicles, which would represent a substantial economic savings. It is also believed that use of the apparatus will be beneficial to the efficiency in all types of combustion systems using fossil fuel for a variety of applications.

BRIEF DESCRIPTION OF DRAWINGS

The invention, both as to its structure and operation, may be further understood by reference to the detailed description below taken in conjunction with the accompanying drawings in which:

FIG. 1 is a side view of the invention shown in longitudinal cross section;

FIG. 2 is a transverse cross-sectional view of the invention taken along line 2—2 of FIG. 1;

FIG. 3 is an exploded view of the invention of FIGS. 1 and 2 shown in perspective;

FIG. 4 is a side view shown in partial longitudinal cross section of another embodiment of the invention;

FIG. 5 is a diagrammatic perspective view illustrating the fluid flow path around the magnetic assembly of the embodiment of FIG. 4;

FIG. 6 is a diagrammatic view in longitudinal cross section of the magnetic core of the embodiment of FIG. 4, and illustrates the magnetic flux lines produced by this magnetic core;

FIG. 7 is a side view in longitudinal cross section of yet another embodiment of the invention;

FIG. 8 is a transverse cross-sectional view taken along line 8—8 of FIG. 7;

FIG. 9 is a side view in partial longitudinal cross section of a further embodiment of the invention;

FIG. 10 is a diagrammatic view in longitudinal cross section of the magnetic core of the embodiment of FIG. 9, and illustrates the magnetic flux lines produced by this core;

FIG. 11 is a perspective view of one of the plurality of inlet screens upstream of the magnetic assembly of the embodiment of FIG. 9; and, FIG. 12 is a side view in partial longitudinal cross section of a still further embodiment of the invention.

DETAILED DESCRIPTION OF THE INVENTION

Figure 12:
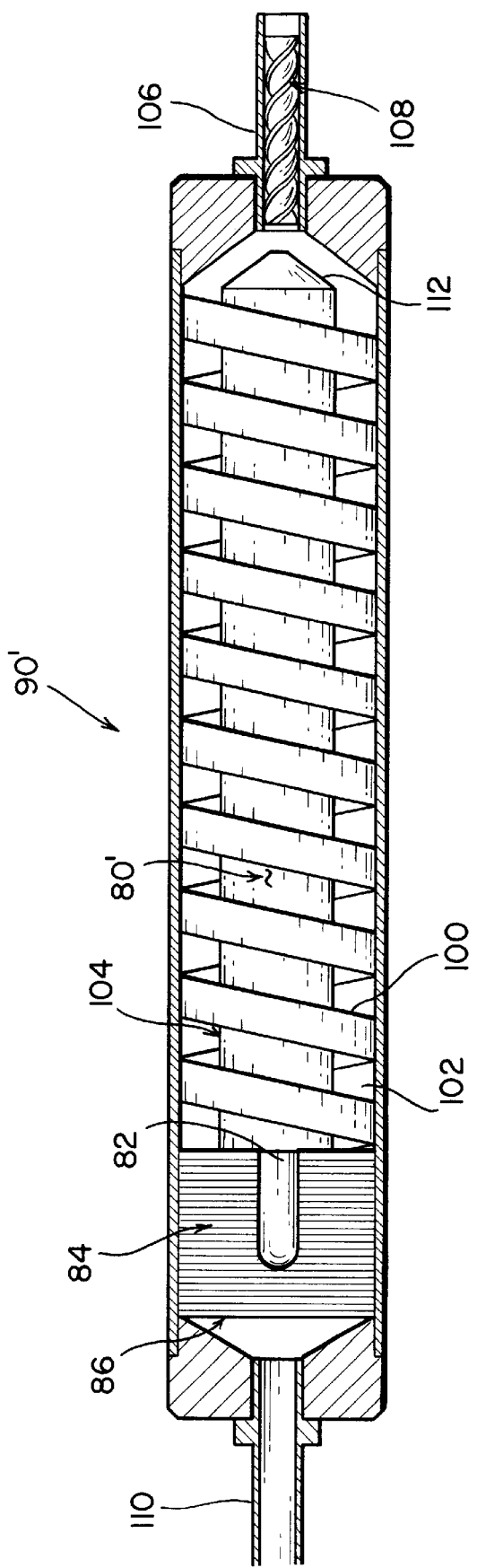

In FIG. 1, there is shown in cross section an apparatus for magnetically treating a fluid, such as water or a hydrocarbon fuel. Housed within a cylindrical casing 12 are a plurality of annular magnetic discs 14 alternated with and separated by a plurality of annular spacer discs 16 that are substantially the same size as the magnetic discs 14. The spacer discs 16 are preferably of a material, such as plastic, that is not attracted to a magnet (non-magnetic). The peripheries of the magnetic and spacer discs are snugly fitted within the inner diameter of the tube wall of the casing 12. The magnetic and spacer discs are assembled in a column as shown in FIG. 1 such that their central holes are in alignment to provide a fluid passage 18.

The spacer discs 16 are preferably made of teflon, and the magnetic discs 14 are preferably made of an alloy of aluminum, nickel and cobalt known as Alnico 8H. Cast Alnico 8H has about a 5.25 energy product and high temperature stability, coercivity and demagnetism resistance. It has a fine grain structure that results in a highly uniform flux distribution and good mechanical strength. Its magnetic intensity is about 6000 oersteds, its recoil permeability is about 3, and its rockwell hardness is about 58.

The fluid passage 18 may be defined solely by the central holes of the discs or by a stainless steel inner tube 19 that is optionally inserted within those central holes. Within the fluid passage 18 is preferably positioned a baffle in the form of a twisted strip 20 that preferably extends for the full length of the passage 18 and is made of stainless steel or some other type of metal or plastic material. The strip 20 is sometimes referred to in the specification as a static accelerator because it functions to impart electrostatic forces to the fluid by accelerating it around the spiral flow channel created by cooperation between the strip and the wall of passage 18.

As shown in FIGS. 1–3, the spacer and magnetic discs in combination with the cylindrical casing 12 form a cylindrical magnetic assembly or cartridge 22, which is housed within a metal or a plastic shell 24, which serves as backup container in the event of a fluid leak occurring within casing 12. In the cartridge 22, opposite poles of adjacent magnets preferably face each other as shown in FIG. 3, such that a north or a positive pole faces a south or negative pole across the intervening spacer disc. Since different or opposite poles attract each other, the column or core of alternating magnets and spacer discs tend to stick together and maintain their alignment even in the absence of the casing 12. In addition, the chamber formed between casing 12 and shell 24 provides a volume which may contain an insulating material 26 having thermal insulating characteristics for maintaining a substantially constant temperature from the inlet to the outlet of the fluid passage 18. The insulation 26 may also have absorbent characteristics to help contain any liquid leaking from casing 12. The outer shell 24, in addition to its cylindrical side wall, includes an end cap 28 carrying an inlet nipple 30, and an end cap 32 carrying an outlet nipple 34 for connecting the treating apparatus between respective ends of a fluid conduit, such as a fuel line. When used to treat a flammable fuel, the apparatus preferably also includes a grounding wire 36 for connecting the shell 24 to ground.

Although the precise technical mechanisms are not known, it is believed that a combination of events occurs that improves the combustion efficiency where the fluid is a fuel, and facilitates the removal of contaminants where the fluid is water or some other solvent. One of these events is turbulence caused by the static accelerator that may generate electrostatic forces within the fuel, and another of these events is the magnetic forces produced by the column of magnets. This combination of events may create a high degree of molecular dissociation in the fluid discharged from the outlet side of the apparatus. Where the fluid is a fuel, this disassociation may improve burning efficiency when the fuel is injected into a combustion chamber. As the result of the improved burning efficiency, the combustion of the fuel results in substantially reduced amounts of hydrocarbons and noxious gases in the exhaust emissions. Improved burning efficiency also improves the power to fuel ratio, which is a measure of the power efficiency of the fuel combustion.

Referring now to FIGS. 4–6, there is shown a modification of the magnetic discs and spacers making up the magnetic cartridge, and of the arrangement of this cartridge within the shell of the apparatus. In this embodiment, the magnetic cartridge 40 is substantially different from the magnetic cartridge 22 of the embodiment of FIGS. 1–3 in that the magnets 42 are of a rare earth type comprising an alloy of neodymium, iron and boron; the discs serving as pole pieces are made of a magnetizable material such as iron or steel and are much thinner than the plastic spacers 16; and the magnets are arranged with like poles facing each other across the pole pieces. The energy product of rare earth magnets may be up to 10 times greater than that of Alnico magnets. The rare earth magnets 42 preferably generate a magnetic intensity of about 30,000 oersteds, and have a recoil permeability of about 1.05, a rockwell hardness of about 5.5, and an energy product of about 27. The rare earth magnets also have high temperature stability, coercivity and demagnetism resistance similar to the Alnico magnets of FIGS. 1–3.

The magnetic cartridge 40 consists primarily of three components, namely magnets 42, pole pieces 44 and a stainless steel tube or casing 46. Like poles of the magnets preferably face each other and the magnets and pole pieces are assembled in the casing so that the magnets energize the pole pieces, which concentrate and direct the magnetic flux lines 48 radially outward through the casing surface. The alternation of like poles facing each other along the length of the cartridge sets up magnetic circuits that create the magnetic flux lines 48 between adjacent pole pieces 44, 44 as shown in FIG. 6.

The geometry of the magnets and pole pieces and the particular type of magnets and the material of the pole pieces, determine the strength and depth of the magnetic field represented by the flux lines 48. The pole pieces are preferably made of a highly magnetizable material, such as iron or steel. Thicker pole pieces and wider spacing between the pole pieces tend to provide a deeper magnetic field (reach out distance), while thinner pole pieces and more narrow spacings between the pole pieces tend to create a shallower and more concentrated field (holding force). Reach out and holding force are both desirable, but may have somewhat conflicting properties. Thus, depending on the particular type of magnets and pole pieces, some adjustments in the sizing of these components may be needed to create an optimum cartridge design.

The magnetic cartridge 40 is housed in a treatment assembly 50 comprising a shell 51 having an end cap 52 with an inlet nipple 54 and an end cap 56 with an outlet nipple 58. A metal or plastic rod is wound in a spiral around the casing 46 of the magnetic cartridge 40 to provide a fluid baffle in the form of a spiral coil 60, which cooperates with the shell 51 to form a spiral passageway 62 for conveying a flowing fluid (represented by arrows 64) through the shell 51 of the treatment assembly 50. The magnetic cartridge 40 preferably includes an inlet nose cone 66 and an outlet nose cone 68 for guiding the flowing fluid into and out of the passageway 62, respectively. Optionally, the inlet passage of nipple 54 and the outlet passage of nipple 58 may contain static accelerators 70 and 72, respectively, each accelerator being in the form of a twisted plastic or metal strip similar to the strip 20 previously described. The transverse dimension of the rod forming the coil 60 is preferably selected so that the cross-sectional area of the spiral channel 62 is equal to or greater than the cross-sectional area of the fluid passage through either the inlet nipple 54 or the outlet nipple 58, so that flow is accelerated.

FIG. 7 is a further embodiment of the invention that combines some of the features of the embodiment of FIGS. 1–3 and the embodiment of FIGS. 4–6, and in which like numeral designations are used for like elements of the embodiments already described. In this embodiment, the shell 24' includes an outer shell wall 74 and an inner shell wall 76 that form a chamber containing the insulation 26. The inner shell wall 76 cooperates with both the casing 12' of magnetic cartridge 22' and with the coil 60' to form a spiral fluid passageway 62' which constitutes a second passageway for fluid flow from inlet nipple 30 to outlet nipple 34. The first passageway 18 for fluid flow between the nipples 30 and 34 contains the fluid accelerator 20 as in the embodiment of FIGS. 1–3. The magnetic cartridge 22' differs from the magnetic cartridge 22 only in that nose cone shapes 78 and 79 have been provided at the respective ends of cartridge 22' for guiding fluid flow into and out of second passageway 62'. As will be readily understood by the skilled person, the magnetic cartridge 40 of the embodiment of FIGS. 4–6 could easily be provided with a central fluid passage and then readily substituted for the magnetic cartridge 22' in the embodiment of FIG. 7. As also evident from FIGS. 1, 4 and 7, it is not necessary for the central and annular passages to convey the fluid all the way from the inlet conduit to the outlet conduit.

Referring now to FIGS. 9–11, there is shown an embodiment of the invention wherein a magnetic cartridge 80 comprises the same types of magnets and pole pieces, and employs the same arrangement thereof, as in the magnetic cartridge 40 of the embodiment of FIGS. 4–6. The difference is that the inlet nose piece is replaced by a cylindrical nose plug 82 on which are mounted a first plurality of screens 84 preceded by a second plurality of screens 86. The screens 84 differ from the screens 86 in that the former contain an aperture for receiving a corresponding portion of the nose plug 82. The sets of screens 84 and 86 preferably include some screens made of silver and some screens made of stainless steel, the silver screens preferably being alternated with the steel screens and all of the screens being in the shape of a disc having an outer periphery conforming to the shape of the inner surface of the shell 88 of the treatment assembly 90. The nose plug 82 is preferably silver plated or otherwise coated with a silver composition. The magnetic cartridge 80 also includes an outer casing 81 and an outlet to nose cone 83. Mounted around the casing 81 is a spiral coil 92 which cooperates with the casing and the shell 88 to form a spiral fluid passage 93 for the fluid flow represented by arrows 94. The treatment assembly 90 further comprises an inlet end cap and nipple 96 and an outlet end cap and nipple 97, the latter preferably containing a static accelerator 98 formed of a twisted metal or plastic strip in the same manner as accelerator 20 previously described. The transverse dimensions of the rods forming the coils 60' and 92 are preferably selected so that the cross-sectional area of the corresponding spiral channel is equal to or greater than the cross-sectional areas of the flow channels through both the inlet nipple and the outlet nipple associated with this channel.

In this embodiment, the spiral coil 92 preferably comprises a plurality of catalytic metals, such as copper, zinc, nickel, magnesium, tin and aluminum, each in substantial amounts. These metals are preferably present in the weight percentage ranges of about 30–50% copper, about 15–35% zinc, about 10–20% nickel, about 10–20% magnesium, about 1–5% tin, and about 1–5% aluminum; more preferably about 35–45% copper, about 20–30% zinc, about 12–18% nickel, about 12–18% magnesium, about 2–3% tin, and about 2–3% aluminum; and most preferably about 40% copper, about 25% zinc, about 15% nickel, about 15% magnesium, about 2.5% tin, and about 2.5% aluminum.

As an alternative to the coil composition described in the preceding paragraph, the spiral coil 92 may be made of one or more of the metals mentioned, and the remainder of the metals mentioned may be incorporated in a coating composition coated on the surface of the casing 81. For example, the coil 92 may be made of copper and the casing 81 coated with a composition comprising by weight about 15–35% zinc, about 10–20% nickel, about 10–20% magnesium, about 1–5% tin, and about 1–5% aluminum; preferably about 20–30% zinc, about 12–18% nickel, about 12–18% magnesium, about 2–3% tin, and about 2–3% aluminum; and more preferably about 25% zinc, about 15% nickel, about 15% magnesium, about 2.5% tin, and about 2.5% aluminum; with the remainder being iron or some other metal element. An alternative coating composition may comprise weight percentages of about 30% zinc, about 10% nickel, about 3–4% aluminum, about 15% magnesium and about 5% tin; with the remainder being iron or some other metal element.

Another embodiment of the invention is the treatment assembly 90' of FIG. 12 which includes the nose plug 82 and the screens 84 and 86 of the embodiment of FIG. 9. The coil 100 of the FIG. 12 embodiment may have substantially the same composition of catalytic metals as the spiral coil 92 of the FIG. 9 embodiment; however, the former is more tightly wound than the latter so that the coil 100 has a greater number of turns per unit length than does the coil 92. Accordingly, the coil 100 has a substantially greater surface area in contact with the fluid than does the coil 92. The spiral coil 100 preferably has a substantially rectangular cross-sectional shape so that the spiral fluid channel 102 also has a substantially rectangular cross-sectional shape. The cross-sectional area of channel 102 is preferably equal to or greater than the cross-sectional area of the fluid passage through either the inlet nipple 110 or the outlet nipple 106, such that fluid flow is not restricted and instead the fluid velocity is accelerated by the channel 102.

In addition, the rear earth magnetic cartridge 80', which forms the center core of the assembly 90', is wrapped with a thin lead film 104 to provide another catalytic element having its surface area in contact with the fluid. In the outlet nipple 106 there is a static accelerator 108 that has about one-half of the turns of the static accelerator 98 shown in FIG. 9. As further evident from FIGS. 9 and 12, it is not necessary for the annular passages 93 and 102 to convey the fluid all the way from the inlet conduit to the outlet conduit.

By way of example for constructing a specific embodiment according to FIG. 12, the spiral coil 100 has an outside diameter of about one and seven-eighths inches (1⅞") and an inside diameter of about 1.0 inch, with a thickness of the coil material in the axial direction of the coil being about one-fourth (¼") of an inch. So that the coil fits firmly against the cylindrical magnetic cartridge 80', the outer diameter of the cylindrical portion of the cartridge is substantially the same as the inside diameter of the coil 100, this outer diameter of about 1.0 inch including the lead film 104, which preferably has a thickness of about 0.01 inch. The length of the cylindrical portion of the magnetic cartridge 80', which excludes the inlet nose 82 and the outlet taper 112, may have a variety of lengths, such as about 4 inches, about 6 inches or about 8 inches, depending on the application. The outlet nipple 108 and the inlet nipple 110 may have an inside diameter in the range of about five-sixteenths (5/16") to about three-eighths (3/8") of an inch.

The specific embodiments described are presented by way of example and not by way of limitation. Thus, the present invention is not limited to the described embodiments which may undergo many different alterations that may occur to those skilled in the art upon learning of the specific embodiments described. For example, one may in particular conceive of various concentric fluid channel arrangements of two or more parallel channels, and one or more of these channels may contain baffles of various shapes for causing turbulence. In addition, various materials may be substituted for those described, particularly with respect to materials used in making the magnets and the intervening spacers. Thus, the scope of the invention is to be defined only by the claims set forth below.

What is claimed is:

1. An apparatus for magnetically treating a fluid, said apparatus comprising:
    an elongated shell having an inlet conduit and an outlet conduit; and,
    a magnetic assembly contained in said shell and comprising a plurality of annular magnets positioned end to end with opposing ends of adjacent magnets separated by an annular spacer member;
    said magnets and spacer member(s) being arranged in a column so as to define a central passage for conveying a first portion of said fluid at least partway from said inlet conduit to said outlet conduit,
    each of said magnets having a south magnetic pole at a first end and a north magnetic pole at a second end opposite to said first end,
    and said magnetic assembly being arranged within said shell to define an annular passage for conveying a second portion of said fluid at least partway from said inlet conduit to said outlet conduit.

2. An apparatus according to claim 1 further comprising a helical baffle arranged in said annular passage to cause said fluid to flow through said annular passage in a spiral pattern crossing magnetic lines of force produced by said column of magnets.

3. An apparatus according to claim 2 further comprising a helical baffle arranged in said central passage to cause said fluid to flow through said central passage in a spiral pattern crossing magnetic lines of force produced by said column of magnets.

4. An apparatus according to claim 2, wherein said fluid is a hydrocarbon fuel, and the composition of said helical baffle comprises sufficient amounts of copper, zinc, nickel, magnesium, tin and aluminum to enhance the combustion efficiency of said fuel.

5. An apparatus according to claim 2, wherein said magnets and spacer member(s) are held in a casing and at least a portion of an outer surface of said casing is coated with a composition comprising zinc, nickel, magnesium, tin and aluminum; wherein said helical baffle has a composition comprising copper; wherein said fluid is a hydrocarbon fuel; and wherein the amounts of zinc, nickel, magnesium, tin, aluminum and copper are sufficient to enhance the combustion efficiency of said fuel.

6. An apparatus according to claim 5, wherein said baffle composition comprises by weight at least about 50% copper; and wherein said coating composition comprises about 15–45% zinc, about 2–20% nickel, about 1–10% aluminum, about 5–25% magnesium, and about 1–10% tin.

7. An apparatus according to claim 1 further comprising a helical baffle arranged in said central passage to cause said fluid to flow through said central passage in a spiral pattern crossing magnetic lines of force produced by said column of magnets.

8. An apparatus according to claim 1, wherein said magnets are arranged in said column such that opposite poles of adjacent magnets face each other across a corresponding spacer member.

9. An apparatus according to claim 1, wherein each annular spacer member is made of a non-magnetic material.

10. An apparatus according to claim 1, wherein said fluid is a hydrocarbon fuel, and wherein said apparatus further comprises means for contacting said fluid with a composition comprising sufficient amounts of copper, zinc, nickel, magnesium, tin and aluminum to enhance the combustion efficiency of said fuel.

11. An apparatus for magnetically treating a hydrocarbon fuel to enhance its combustion efficiency, said apparatus comprising:
    an elongated shell having an inlet conduit and an outlet conduit;
    a magnetic assembly arranged within said shell to define an annular passage for conveying at least a portion of said fluid at least partway from said inlet conduit to said outlet conduit of said shell; and,
    a helical baffle arranged in said annular passage to cause said fluid to flow through said annular passage in a spiral pattern crossing magnetic lines of force produced by said column of magnets; said magnetic assembly comprising a plurality of magnetic discs positioned end-to-end in a column with opposing ends of adjacent magnets separated by a metal disc serving as a pole piece.

12. An apparatus according to claim 11, wherein the composition of said helical baffle comprises sufficient amounts of copper, zinc, nickel, magnesium, tin and aluminum to enhance the combustion efficiency of said fuel.

13. An apparatus according to claim 12, wherein said baffle composition comprises by weight about 25–55% copper, about 15–35% zinc, about 5–25% nickel, about 5–25% magnesium, about 1–10% tin and about 1–10% aluminum.

14. An apparatus according to claim 11, wherein said helical baffle has a composition comprising copper; wherein said magnets and said spacer member(s) are held in a casing and at least a portion of an outer surface of said casing is coated with a composition comprising zinc, nickel, magnesium, tin and aluminum; and wherein the amounts of zinc, nickel, magnesium, tin, aluminum and copper are sufficient to enhance the combustion efficiency of said fuel.

15. An apparatus according to claim 14, wherein said baffle composition comprises by weight at least about 50% copper; and wherein said coating composition comprises about 15–45% zinc, about 2–20% nickel, about 1–10% aluminum, about 5–25% magnesium, and about 1–10% tin.

16. An apparatus according to claim 11, wherein each of said magnets has a south magnetic pole at a first end and a north magnetic pole at a second end opposite to said first end, and wherein said magnets are arranged in said column such that like poles of adjacent magnets face each other across a corresponding pole piece.

17. An apparatus according to claim 11, wherein a plurality of screen members are positioned between said column of magnets and the inlet of said shell; and wherein at least one of said screen members has a composition comprising silver and at least one other of said screen members has a composition comprising stainless steel.

18. An apparatus according to claim 11, wherein a plurality of silver screen members and a plurality of stainless steel screen members are positioned between said column of magnets and the inlet of said shell, and said silver screen members are alternated with said stainless steel screen members.

19. An apparatus according to claim 18, wherein at least a portion of said silver screen members and at least a portion of said stainless steel screen members are mounted on an extension of said magnetic assembly having a transverse cross sectional area substantially less than the transverse cross sectional area of said column of magnets; and wherein said extension is coated with a composition comprising a substantial amount of silver.

20. An apparatus according to claim 11, wherein said magnets and said spacer member(s) are held in a casing, and at least a portion of an outer surface of said casing is covered with a film of lead for contacting said fluid.

21. An apparatus according to claim 11, wherein said annular passage has a cross-sectional area equal to or greater than the cross-sectional area of either said inlet conduit or said outlet conduit.

* * * * *